United States Patent [19]
Kim

[11] Patent Number: 5,982,880
[45] Date of Patent: Nov. 9, 1999

[54] METHOD AND APPARATUS FOR CANCELING TONE SIGNAL NOISE GENERATED WHEN USING A SPEAKERPHONE IN A DIGITAL KEY TELEPHONE APPARATUS

[75] Inventor: Chang-Joo Kim, Ahnyang, Rep. of Korea

[73] Assignee: SamSung Electronics Co., Ltd., Kyungki-do, Rep. of Korea

[21] Appl. No.: 08/657,761

[22] Filed: May 31, 1996

[30] Foreign Application Priority Data

May 31, 1995 [KR] Rep. of Korea ...................... 95/14070

[51] Int. Cl.⁶ ..................................................... H04M 1/00
[52] U.S. Cl. .......................... 379/388; 379/392; 379/420; 379/421; 379/156
[58] Field of Search ..................................... 379/388, 392, 379/420, 421, 368–370, 390, 156

[56] References Cited

U.S. PATENT DOCUMENTS 4,087,638  5/1978  Hayes et al. .
4,406,926  9/1983  Duncun .
4,442,322  4/1984  Grnatland .
4,467,140  8/1984  Fathauer et al. .
4,472,601  9/1984  Wilson .
4,496,799  1/1985  Kingen et al. .
4,907,258  3/1990  Kamimoto ............................. 379/157
5,073,923  12/1991 Offers et al. ............................ 379/165
5,384,842  1/1995  Tapping et al. ........................ 379/387

OTHER PUBLICATIONS

Newton's Telecom Dictionary by Harry Newton 8th Edition p. 582 "Key Telephone System", 1994.

*Primary Examiner*—N. Le
*Assistant Examiner*—Shih-Wen Hsieh
*Attorney, Agent, or Firm*—Robert E. Bushnell, Esq.

[57] ABSTRACT

A technique for eliminating tone signal noise generated using a speakerphone, in which the communication path of a microphone is interrupted when a key is pressed, and then the communication path of the microphone is linked only after a constant time period after the key has been released, thereby eliminating the noise input through the microphone during usage of the speakerphone.

8 Claims, 4 Drawing Sheets

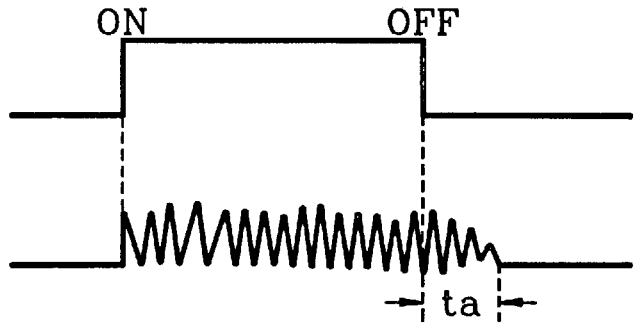
Fig. 3A
Fig. 3B
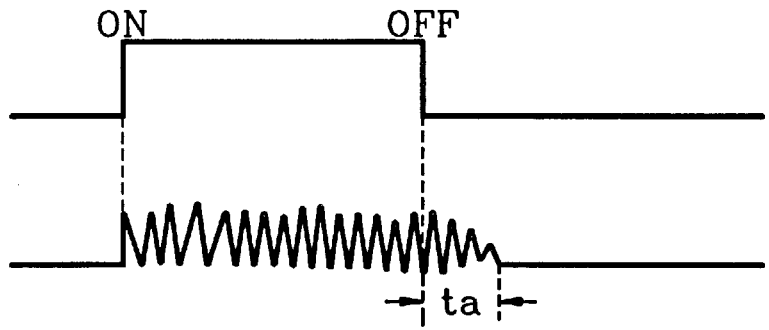
Fig. 4A
Fig. 4B
Fig. 4C

METHOD AND APPARATUS FOR CANCELING TONE SIGNAL NOISE GENERATED WHEN USING A SPEAKERPHONE IN A DIGITAL KEY TELEPHONE APPARATUS

CLAIM OF PRIORITY

This application makes reference to, incorporates the same herein, and claims all benefits accruing under 35 U.S.C. §119 from a patent application entitled METHOD OF CANCELING NOISE OF A TONE SIGNAL IN USING A SPEAKERPHONE IN A DIGITAL KEY PHONE APPARATUS, earlier filed in the Korean Industrial Property Office, on the 31st day of May 1995, and there assigned Ser. No. 14070/1995.

BACKGROUND OF THE INVENTION

The present invention relates to digital key telephone desksets, and more particularly, to a method and circuit for canceling a tone signal noise generated in using a speakerphone deskset.

Typically, in digital key telephone deskset, a dual tone multifrequency signal (hereinafter referred to as a "DTMF" signal) is generated in correspondence with the different ones of the number keys of a keypad pressed by a user when using a speakerphone deskset, and noise that is input via the microphone of the speakerphone are concurrently transmitted to the key telephone main equipment. If the user presses number keys using the keypad of the deskset, the microprocessor controls a tone generator included in telephone communication unit to generate the DTMF signal corresponding to the pressed number keys. The DTMF signal is transmitted to a data transmitter via network controller and coder. The data transmitter transmits the DTMF signal to the key telephone main equipment together with a channel D among 2B+D channels. Since the user uses a speakerphone, a communication path including the microphone of the deskset is formed. Thus, in using the speakerphone, the noise input through the microphone is transmitted to the data transmitter via switch, an analog-to-digital converter, a transmitting bandpass filter, network controller and coder. The data transmitter transmits the noise to key telephone main equipment together with a channel B among 2+D channels.

Therefore, the DTMF signal and the noise are mixed in the network formed when the key telephone main equipment transmits the DTMF signal to another exchange system via a central office line. As the result, a DTMF receiver of another exchange system for receiving the DTMF signal from the central office line can not precisely analyze the DTMF signal due to the noise. The noise input to the microphone of the digital key telephone apparatus is the sounds, i.e., the noise, generated when the number keys are pressed. The tone signal noise generated when the user presses the number keys. The DTMF signal is not intense so as to be negligible while keys are being pressed. The DTMF signal is however, severely affected by the noise when the keys are pressed into an electrically conducting, or "on", state or released to an electrically non-conducting, or "off", state. Since the noise is maintained for a predetermined time period ta when a key is released (no longer pressed), the quality of the DTMF signal is considerably deleteriously affected.

SUMMARY OF THE INVENTION

It is therefore, an object of the present invention to provide an improved process and circuit for controlling operation of a speakerphone deskset.

It is another object to provide a process and apparatus for receiving an exact tone signal from another exchange system using a speakerphone in a digital key telephone apparatus.

It is another object to provide a process and apparatus for canceling noise mingled with a tone signal using a speakerphone in a digital key telephone apparatus.

These and other objects may be accomplished by interrupting the communication path of a microphone when a key is pressed and to link the communication path of the microphone at a predetermined time after a key has been released.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIGS. 3A and 3B are waveform diagrams showing the generation of the noise of a tone signal using a conventional speakerphone;

FIGS. 4A through 4C are waveform diagrams illustrating the canceling of tone signal noise generated using a speakerphone according to the present invention.

DETAILED DESCRIPTION OF THE INVENTION

Figure 1:
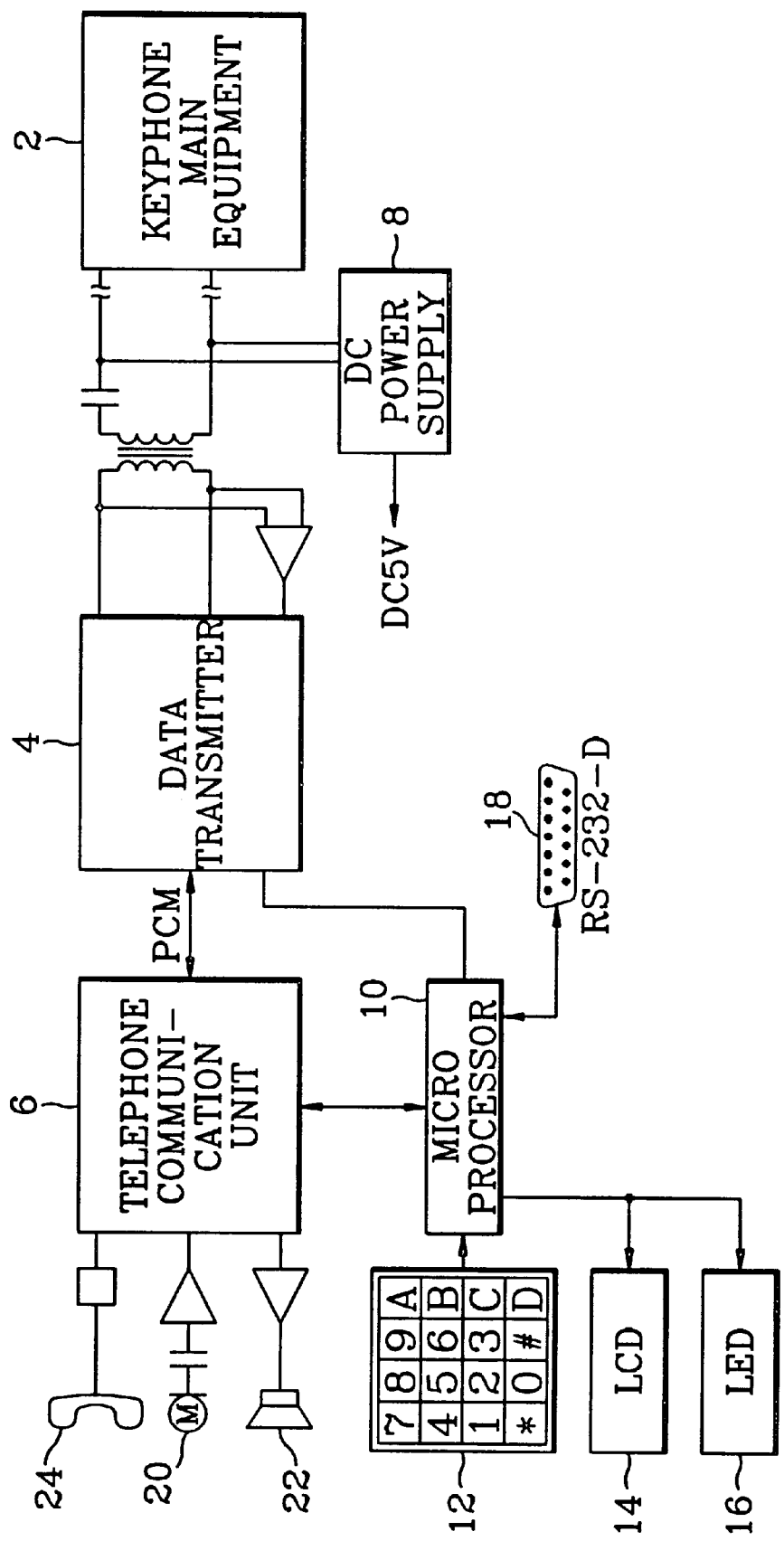
FIG. 1 is a schematic block diagram of a general digital key telephone apparatus.

Turning now to the drawings, FIG. 1 is a schematic block diagram of a general digital key telephone apparatus, which includes key telephone main equipment 2, a data transmitter 4, a telephone communication unit 6, a direct current power supply 8, a microprocessor 10, a keypad 12, an LCD 14, an LED 16, an RS232-D interface 18, a microphone 20, a speaker 22 and a handset 24. Data transmitter 4 adopts a ping-pong transmission and performs a two-line 512Kbps pingpong transmission (2B+113). Data transmitter 4 is generally formed on a single chip; TC35321P/F is a typical commercially available chip. Telephone communication unit 6 provides for a serial or parallel interface and a PCM codec interface with microprocessor 10. The interface with microprocessor 10 has an 8-word address space. Telephone communication unit 6 is also formed on a single chip; and TC35320AN is a typical commercially available integrated circuit chip. The TC35320AN chip is generally called a high-feature codec (i.e., a coder and decoder combined).

Figure 2:
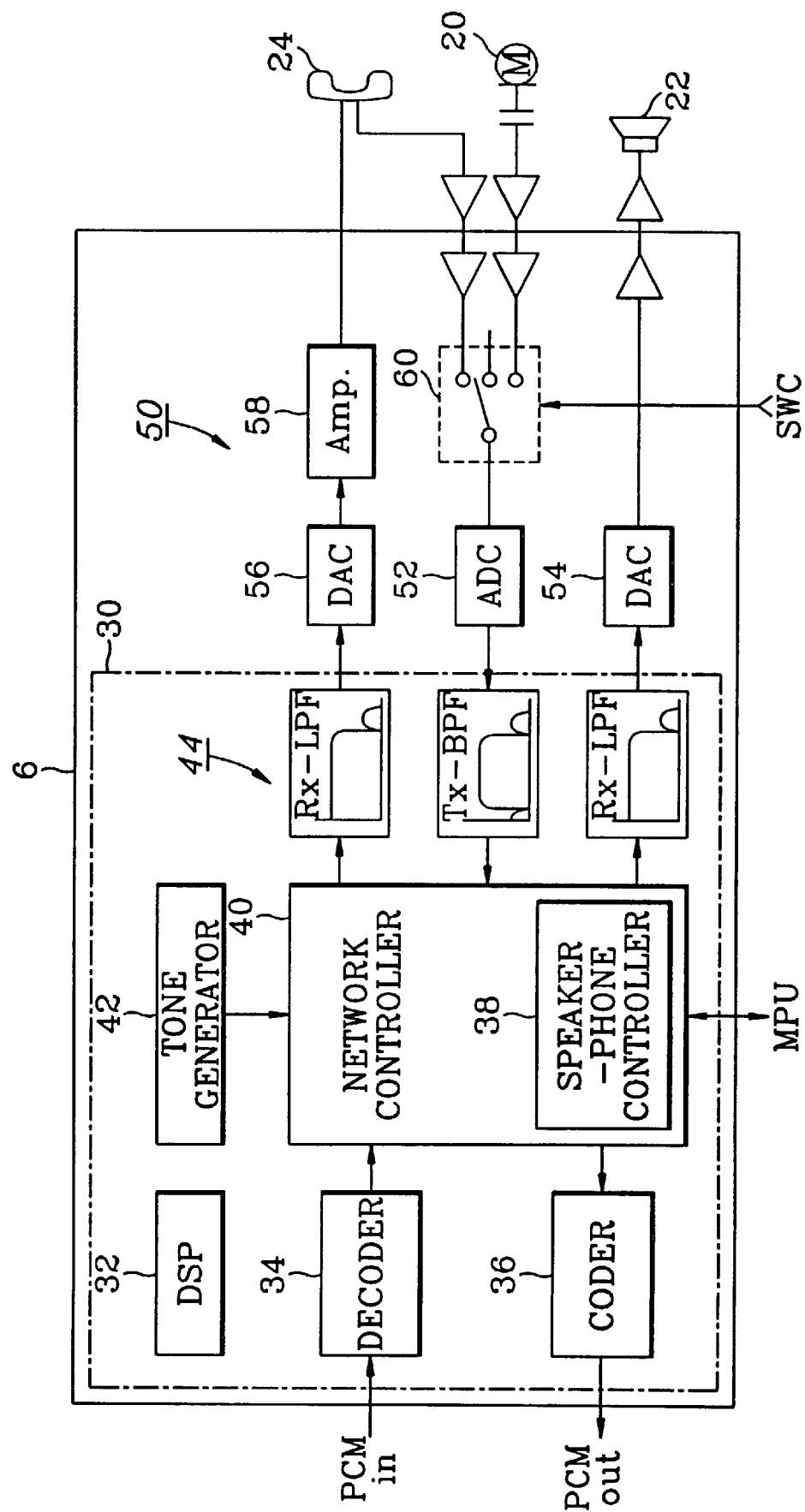
FIG. 2 is a detailed block diagram of a telephone communicating unit shown in FIG. 1.

FIG. 2 is a detailed block diagram of telephone communication unit 6. Referring to FIG. 2, telephone communication unit 6 includes a digital logic circuit 30 and an analog logic circuit 50. Digital logic circuit 30 includes a digital signal processor (DSP) 32, a decoder 34, a coder 36, a tone generator 42, a network controller 40 having a speakerphone controller 38, and a filter 44. Analog logic circuit 50 includes an analog-to-digital converter (ADC) 52 and a digital-to-analog converter (DAC) 54 and 56, an amplifier (AMP) 58 for outputting an amplified voice signal to a handset 24, and a switch 60 for switching between a microphone of the handset 24 or an external microphone 20.

The configuration shown in FIGS. 1 and 2 is well known to the public, and a more detailed explanation thereof has been omitted herein. In the digital key telephone apparatus having the configuration represented by FIGS. 1 and 2, a dual tone multifrequency signal (hereinafter referred to as a "DTMF" signal) corresponding to the number keys pressed by a user when using a speakerphone, and noise which is input via the microphone 20 are concurrently transmitted to the key telephone main equipment 2.

If the user presses number keys using the keypad 12, microprocessor 10 controls the tone generator 42 included in telephone communication unit 6 to generate the DTMF signal corresponding to the pressed number keys. The DTMF signal is transmitted to the data transmitter 4 of FIG. 1 via network controller 40 and coder 36. The data transmitter 4 transmits the DTMF signal to the key telephone main equipment 2 together with a channel D among 2+D channels. At this time, since the user uses a speakerphone, a communication path including the microphone 20 is formed. Thus, in using the speakerphone, the noise input through the microphone 20 is transmitted to the data transmitter 4 via switch 60, A/D converter 52, a transmitting bandpass filter of filter 44, network controller 40 and coder 36. The data transmitter 4 transmits the noise to key telephone main equipment 2 together with a channel B among 2+D channels.

Therefore, the DTMF signal and the noise are mixed in the network formed when the key telephone main equipment 2 transmits the DTMF signal to another exchange system via a central office line. As the result, a DTMF receiver of another exchange system for receiving the DTMF signal from the central office line can not precisely analyze the DTMF signal due to the noise. The noise input to microphone 20 of the digital key telephone apparatus is the sounds, i.e., noise, generated when the number keys are pressed.

FIG. 3A is a waveform diagram produced when the user presses the number keys, and FIG. 3B is a waveform diagram showing the tone signal noise generated when the user presses the number keys. The DTMF signal is not intense so as to be negligible while keys are being pressed. However, the DTMF signal is severely affected by the noise when the keys are pressed (ON) or released (OFF). Since the noise is maintained for a predetermined time period $t_a$ when a key is released (no longer pressed), as shown in FIG. 3B, the DTMF signal is considerably affected.

Figure 5:
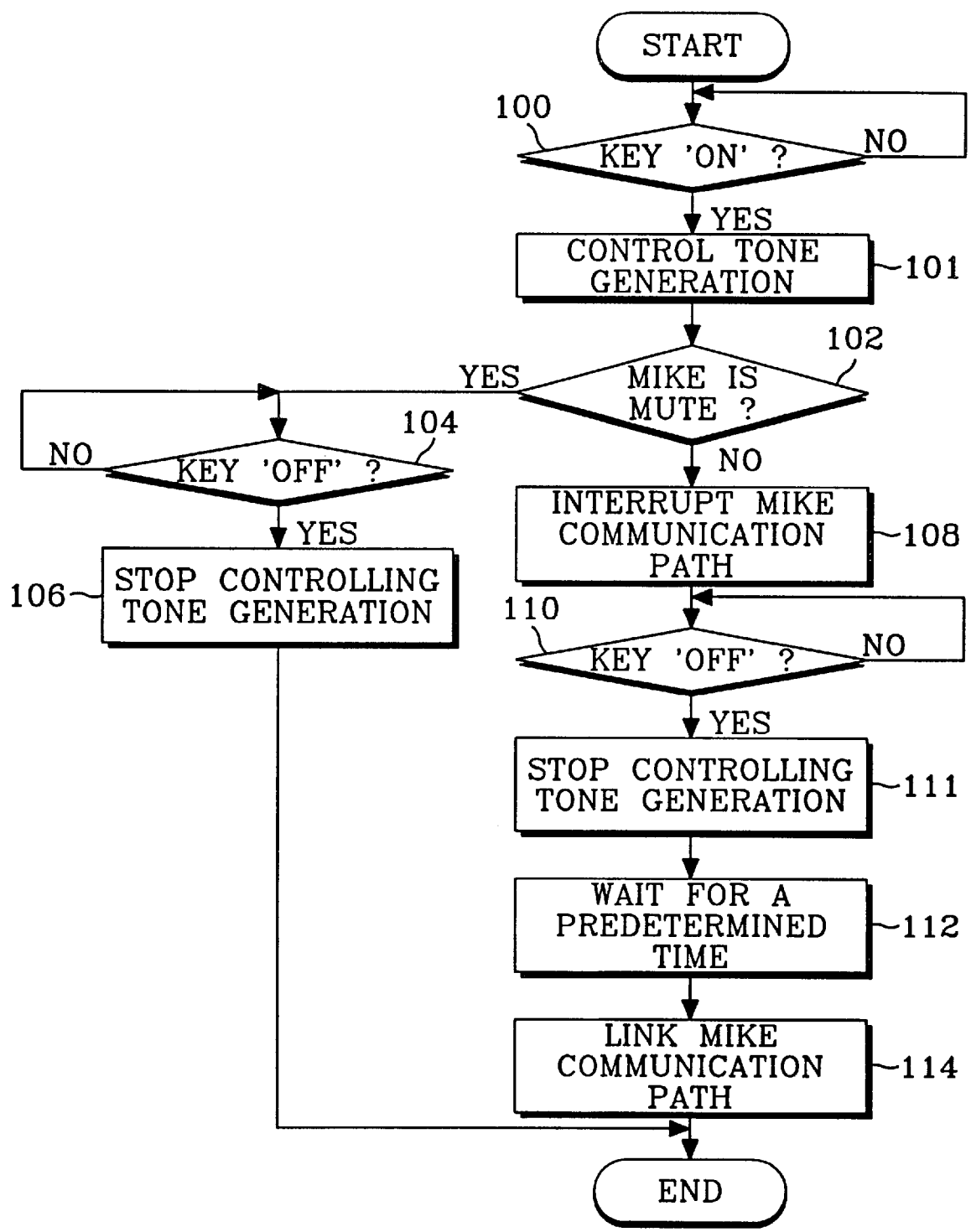
FIG. 5 is a flowchart illustrating the steps of controlling the generation of tone signal noise generated using a speakerphone according to the present invention.

In the practice of the present invention, microprocessor 10 shown in FIG. 1 performs a controlling operation, as shown in FIG. 5, to prevent noise from being input when a key is pressed. If a user presses a predetermined key using a keypad 12, the microprocessor 10 detects a key 'on' state in step 100, and controls the tone generator 42 of the telephone communication unit 6 for generating the DTMF signal corresponding to the predetermined key in step 101. Then, the microprocessor 10 immediately proceeds to step 102 to determine whether or not the microphone is in a mute state. If the microphone is in a mute state, the user is using a handset. If the microphone is not in a mute state, the user is using a speakerphone.

If it is determined in step 102 that the microphone is in a mute state, i.e., in a communication state using a handset, then the microprocessor 10 performs step 104. In step 104, it is determined whether or not the key is off. If the key is off, the process proceeds to step 106 to stop the control of a tone generation.

If it is determined in step 102 that the microphone is not in a mute state, i.e., in a communication state using a speakerphone, then the microprocessor 10 performs step 108. In step 108, the microprocessor 10 applies a switching control signal (SWC) to the switch 60 of the telephone communication unit 6 to interrupt the communication path of microphone 20. In other words, switch 60 does not link the communication path to either the microphone 20 or the handset 24.

In an embodiment constructed according to the principles of the present invention, the interruption of the communication path of microphone 20 is performed by switch 60. It must be understood however, that the interruption may be effected by the network controller 40.

After performing step 108, the microprocessor 10 determines in step 110 whether or not the key is off. If it is detected that the key is off, the process proceeds to a step 111 to stop controlling a tone generation. Microprocessor 10 however, does immediately not link the communication path of microphone 20 even at the point of time when the key is off. In other words, the microprocessor 10 performs step 112 by waiting for a predetermined time period $t_d$, e.g., 2 seconds, after the key-off time point, and proceeds to step 114 after the delay for the predetermined time period $t_d$ to link the communication path of microphone 20.

FIGS. 4A through 4C are waveform diagrams illustrating the canceling of the tone signal noise generated during using a speakerphone according to the present invention, in which FIGS. 4A and 4B correspond to FIGS. 3A and 3B, respectively, and FIG. 4C shows the time in which the communication path of the microphone 20 is interrupted. As shown in FIG. 4C, the communication path of the microphone 20 is not linked for the time period $t_d$. Accordingly, the noise generated in the time period $t_a$. shown in FIG. 4B is not applied to key telephone main equipment 2.

As described above, according to the present invention, since the communication path of a microphone is interrupted when a key is pressed, and then the communication path of the microphone is linked only after a constant time period after the key has been released, the noise input through the microphone during the usage of a speakerphone can be eliminated.

What is claimed is:

1. A method of canceling tone signal noise when using a speakerphone, having a microphone disposed therein and having a keypad consisting of a number of keys, for a digital key telephone apparatus in a digital key telephone system, the method comprising the steps of:

generating a tone signal corresponding to a predetermined key when the predetermined key of the speakerphone has been pressed;

interrupting a communication path of the microphone disposed within the speakerphone to the key telephone system when the predetermined key has been pressed;

stopping the generation of the tone signal in response to the release of the pressed predetermined key; and linking the communication path of the microphone disposed within the speakerphone to the key telephone system after a predetermined time delay from the time when the predetermined key has been pressed.

2. A method of canceling tone signal noise as recited in claim 1, wherein the predetermined time delay is two seconds.

3. A method of canceling tone signal noise when a predetermined key of a digital key telephone apparatus having a speakerphone in a digital key telephone system is pressed, the method comprising the steps of:

generating a tone signal corresponding to a predetermined key when the predetermined key is pressed;

determining whether a microphone disposed within the speakerphone in the digital key telephone apparatus is in a mute state;

stopping the generation of the tone signal in response to the release of the predetermined key when it is determined that the microphone is in a mute state;

interrupting a communication path of the microphone disposed within the speakerphone to the key telephone system when it has been determined that the predetermined key has been pressed;

stopping the generation of the tone signal in response to the release of the predetermined pressed key; and linking the communication path of the microphone disposed within the speakerphone after a predetermined time delay from the time when the predetermined key has been pressed.

4. A method of canceling tone signal noise as recited in claim 3, wherein the predetermined time delay is two seconds.

5. An apparatus for canceling tone signal noise when using a speakerphone, having a microphone disposed therein and having a keypad comprised of a plurality of keys, for a digital key telephone apparatus in a digital key telephone system, comprising:

a generator for generating a tone signal corresponding to a predetermined key when the predetermined key of the speakerphone has been pressed;

a switch positionable to interrupt a communication path of the microphone disposed within the speakerphone to the key telephone system when the predetermined key has been pressed, said switch linking the communication path of the microphone disposed within the speakerphone to the key telephone system after a predetermined time delay from the time when the predetermined key has been pressed; and said generator stopping the generation of the tone signal in response to the release of the pressed predetermined key.

6. An apparatus for canceling tone signal noise as recited in claim 5, wherein the predetermined time delay of the switch is two seconds.

7. An apparatus for canceling tone signal noise when a predetermined key for a digital key telephone apparatus having a speakerphone in a digital key telephone system is pressed, comprising:

a generator for generating a tone signal corresponding to a predetermined key when the predetermined key is pressed;

means for determining whether a microphone disposed within the speakerphone in the digital key telephone apparatus is in a mute state;

said generator comprised of a means for stopping the generation of the tone signal in response to the release of the predetermined pressed key when the determining means has determined that the microphone is in a mute state;

means for interrupting a communication path of a microphone disposed within the speakerphone to the key telephone system when the determining means has determined that the predetermined key has been pressed;

said generator further comprised of means for stopping the generation of the tone signal in response to the release of the predetermined pressed key; and means for linking the communication path of the microphone disposed within the speakerphone after a predetermined time delay from the time when the predetermined key has been pressed.

8. An apparatus for canceling the signal noise as recited in claim 7, wherein the predetermined time delay of the linking means is two seconds.

* * * * *